April 28, 1942.  G. R. POLE  2,280,848
MAKING ALKALI METAL PHOSPHATES
Filed Dec. 15, 1939
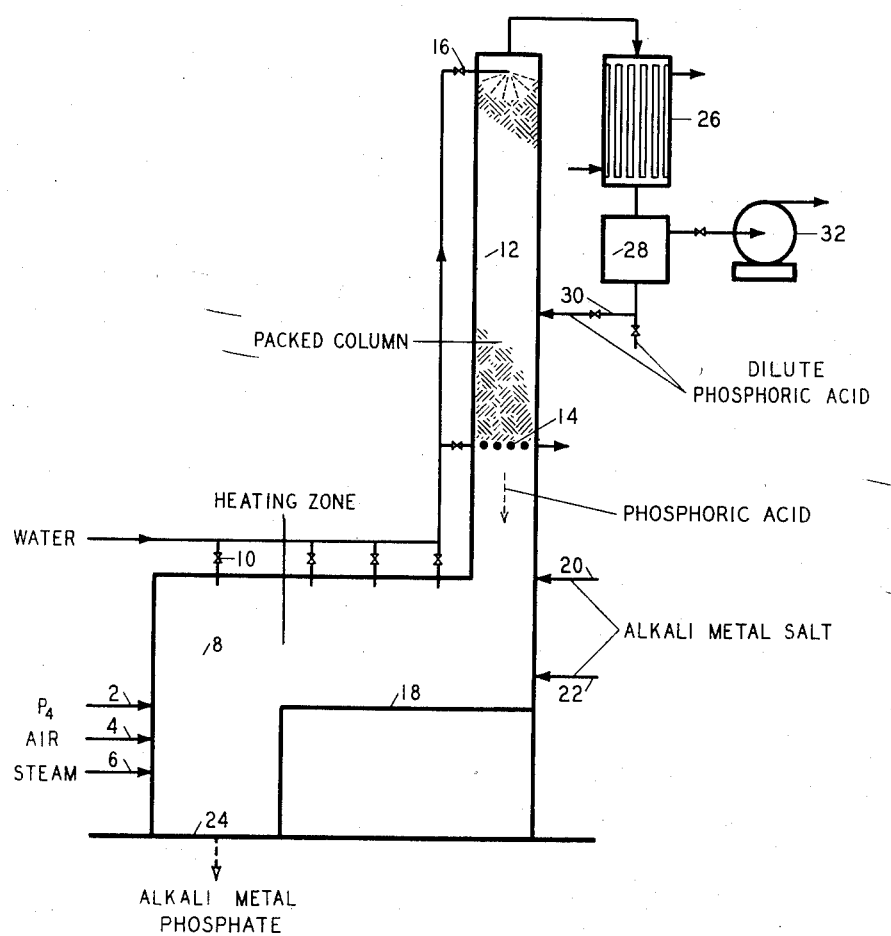
Gordon R. Pole
INVENTOR
BY Arthur L. Davis
ATTORNEY Patented Apr. 28, 1942

2,280,848

UNITED STATES PATENT OFFICE 2,280,848

MAKING ALKALI METAL PHOSPHATES

Gordon R. Pole, near Sheffield, Ala.

Application December 15, 1939, Serial No. 309,372

5 Claims. (Cl. 23—106)

(Granted under the act of March 3, 1883, as amended April 30, 1928; 370 O. G. 757)

The invention herein described may be manufactured and used by or for the Government for governmental purposes without the payment to me of any royalty thereon.

This invention relates to the art of making alkali metal phosphates, particularly alkali metal metaphosphates, pyrophosphates and orthophosphates.

The principal object of this invention is to provide a method for making high density stable alkali metal metaphosphates and compositions containing the same suitable for use in the various arts, including plant feeding and water softening. Another object of this invention is to provide a method for the direct production of alkali metaphosphates from a hydrated oxidation product of phosphorus without the separation and withdrawal of such a product from the system. Still another object of this invention is to utilize the heat of combustion of elemental phosphorus normally used in producing a hot gaseous mixture containing the metaphosphoric acid reactant to complete the reaction between the reactants and to produce a fused product. A still further object of this invention is to provide a method for producing potassium containing material which is available as a plant food but which has a lower solubility in water than potassium compounds ordinarily employed for this purpose. Yet another object of this invention is to provide a method for producing a stable metaphosphate containing both alkali metal and alkaline earth metal in combination which is available for plant food and is less hygroscopic than the alkali metal metaphosphate alone. Other objects of this invention include the provision of making alkali metal phosphates, such as alkali metal pyrophosphate and trisodium orthophosphate which are extensively used in the textile, tanning, baking, and ceramic industries.

The usual procedure for the production of alkali metal phosphates comprises mixing an alkali metal salt in proper proportion with phosphoric acid in a reactor and then heating the mixture in a furnace to produce an anhydrous phosphate. It has also been proposed to produce alkali metal phosphates by reacting phosphorus pentoxide produced by the burning of phosphorus or phosphorus containing gas with an alkali metal salt in a rotary furnace lined either with solid or liquid phosphate which is to be produced. In the latter process the alkali metal phosphate formed is discharged from the rotary furnace and unreacted phosphorus pentoxide and/or other acidic material produced is recovered in a separate acid absorption system.

I have discovered a process of making an alkali metal phosphate from an alkali metal compound, reactive with phosphoric acid to form an alkali metal phosphate, and phosphoric acid, by forming a hot gaseous mixture containing metaphosphoric acid in a heating zone in which the lowest temperature is above the melting point of the alkali metal phosphate subsequently formed, by separating the metaphosphoric acid from the gaseous material outside of the heating zone, by returning the separated phosphoric acid to the heating zone, by admitting the alkali metal compound to the phosphoric acid so returned to the heating zone, and maintaining the temperature in the heating zone so that a substantial portion of the alkali metal compound and the phosphoric acid in the mixture react to form the fused alkali metal phosphate. This improvement also includes the recovery and separation of that portion of the alkali metal compound and the phosphoric acid in the mixture of the alkali metal compound and the phosphoric acid which does not react and is volatilized into the hot gaseous mixture present in the heating zone.

In the accompanying drawing which forms a part of the specification, the figure is a diagrammatic vertical sectional view of one form of apparatus for the embodiment of my invention. Elemental phosphorus through line 2, air through line 4 and any steam required through line 6 are admitted into the heating zone 8 where the elemental phosphorus is oxidized to phosphorus pentoxide and the phosphorus pentoxide is hydrated into metaphosphoric acid. To complete hydration of the phosphorus pentoxide to metaphosphoric acid and/or partial cooling of the hot gaseous mixture prior to separation of the metaphosphoric acid to a temperature not below the melting point of the phosphate to be formed, may be attained by admitting water or other suitable aqueous fluid into the heating zone through one or more of a plurality of inlets, represented by inlet 10. The partially cooled mixture carrying the metaphosphoric acid passes into the bottom of a packed column 12 in which the packing is supported by a water cooled grate 14 wherein the temperature gradient throughout is maintained such that the temperature required for the production of phosphoric acid to be separated prevails at the bottom of packed column 12. The temperature above the dew point of the gaseous mixture, containing a substantial proportion of steam, is maintained at the top of packed column 12, and at least part of the control of the temperature gradient referred to above may be attained by admitting water or other suitable aqueous fluid through one or more of a plurality of inlets, represented by inlet 16. The liquid phosphoric acid which reaches the bottom of the packed column 12 drops therefrom onto an elevated hearth 18. Fine alkali metal salts or compounds, either separately or admixed with fine calcium containing compounds all of which are reactive with the liquid phosphoric acid to form the respective phosphates, are admitted either to that portion of the combustion chamber above the elevated hearth 18, through one or more of a plurality of inlets, represented by inlet 20, or are admitted onto the elevated hearth 18, by one or more of a plurality of inlets, represented by inlet 22. The temperature in the combustion chamber is so regulated that the temperature on the elevated hearth 18 below the packed column 12 is such as to cause the salts or compounds and phosphoric acid admitted thereto to react and form fused alkali metal phosphate. This fused alkali metal phosphate may be withdrawn from hearth 24 or from the side or sides of elevated hearth 18 as required, depending upon the temperature gradient maintained throughout the heating zone. The gaseous mixture which passes to the top of the packed column 12 is withdrawn through a suitable acid collecting system represented by condenser 26 wherein at least sufficient condensation takes place to effect the separation of that relatively small proportion of phosphoric acid which is carried by the gaseous mixture. The gas and liquid condensate from the condenser 26 passes into separator 28 which retains the condensate while the gas separated therefrom passes to exhauster 32 which maintains a proper pressure differential throughout the system. The liquid condensate or phosphoric acid so separated passes through valved line 30 into the lower portion of column 12 and thereby aids in not only maintaining the proper temperature gradient in the bottom of the column but also aids in washing out that portion of the volatilized alkali metal compound which has been separated from the hot gaseous mixture as it passes through that part of the column.

One example of the operation of my process is given for the production of sodium metaphosphate from sodium chloride and elemental phosphorus. The elemental phosphorus is burned using an excess of air to form the hot gaseous mixture containing phosphorus pentoxide and the phosphorus pentoxide in the hot gaseous mixture thus formed is hydrated to metaphosphoric acid and partially cooled by the admission of steam and/or water to the hot gaseous mixture. The partially cooled mixture is passed upwardly through a packed column wherein the temperature at the bottom of the column is maintained at approximately 700° C., with predetermined control of excess air, excess water and gas velocity through the column. The phosphoric acid separated from the packed column drops from the latter as a liquid on the elevated hearth portion of the chamber below the column. Fine sodium chloride is blown with air into the descending liquid metaphosphoric acid. A substantial portion of the sodium chloride reacts with the phosphoric acid and the resulting sodium metaphosphate is fused on the elevated hearth and withdrawn from the heating zone. That portion of the phosphoric acid which does not react immediately is volatilized and the sodium chloride which is either volatilized or entrained in the hot gaseous mixture entering the column are separated therein and returned to the elevated hearth for contact with subsequent portions of the fine sodium chloride charged.

Another example for the operation of my process is given for the production of calcium potassium metaphosphate from rock phosphate, potassium chloride and elemental phosphorus. The conditions of operation are the same as those given in the first example above except that in addition Tennessee brown rock phosphate is blown with air into the descending liquid metaphosphoric acid. The resulting calcium potassium metaphosphate is a light brown glassy material with appearance similar to that of solidified fused calcium metaphosphate. An analysis of a representative sample of the calcium potassium metaphosphate so produced showed the contents to be 19.3% CaO, 54.2% $P_2O_5$, 15.6% $K_2O$ and 0.9% citrate insoluble. These values correspond to the following respective mol ratios $P_2O_5:CaO::1.11:1$; $P_2O_5:K_2O::2.3:1$; and $P_2O_5:CaO+K_2O::0.75:1$. Notwithstanding the apparent excess of phosphorous pentoxide in the compound over that corresponding to normal metaphosphates this calcium potassium metaphosphate appears to be quite stable and remains unchanged even when it is exposed to a moist atmosphere for a number of months.

It is evident that there are numerous factors which will influence conditions for the most satisfactory operation of my invention, the actual limits of which cannot be established except by a detailed study of each set of raw materials and the intermediate and finished products involved.

The metaphosphoric acid used is preferably produced by the oxidation of elemental phosphorus to phosphorus pentoxide, by the hydration of the phosphorus pentoxide to metaphosphoric acid, by cooling the hot gaseous mixture carrying the metaphosphoric acid, and by separating the metaphosphoric acid from such a hot gaseous mixture. Using this procedure it is quite convenient to contact the hot liquid phosphoric acid with fine rock phosphate rather than to carry out this same procedure with cold metaphosphoric acid followed by heating the mixture until the reaction between the rock phosphate and the metaphosphoric acid takes place and the reacting product fuses.

The alkali metal containing material used may be any such material which is reactive with liquid phosphoric acid to form the alkali metal phosphate being produced. From the standpoint of economy it is particularly preferable to use those alkali metal compounds which are derived directly from natural sources and involve a minimum expense incident to their concentration and at least partial purification. Many other alkali metal compounds, such as carbonates and hydroxides, are suitable for the production of alkali metal phosphates therefrom but the use of such more expensive and highly reactive compounds is unnecessary, particularly since this invention is directed towards an improvement which avoids the necessity of the use of such highly reactive materials. According to the best authorities potassium chloride and sodium chloride have melting points of 790° C. and 804° C. respectively while the corresponding metaphosphates have melting points of 798° C. and 616° C. respectively, the corresponding pyrophosphates have melting points of 1090° C. and 988° C. respectively and the corresponding orthophosphates have melting points of 1340° C. and 1340° C. respectively. The melting points of the crude phosphates produced from crude chlorides may be somewhat lower than the above values, depending upon the amount and character of the impurities present.

While the present invention is directed primarily to the production of alkali metal metaphosphates, pyrophosphates and orthophosphates, the combination of process steps involved is equally adapted for the production of calcium alkali metal metaphosphates under circumstances where it is desirable to have such a combination in intimate contact. This is particularly desirable in connection with the production of fertilizer material, such as calcium potassium metaphosphate, which not only contains a substantial portion of potassium metaphosphate but calcium metaphosphate as well. Where it is desired to produce such a complex metaphosphate the calcium containing material used may be any such material which is reactive with metaphosphoric acid to form calcium metaphosphate. Naturally, because of its high $P_2O_5$ content, rock phosphate is preferred for this purpose. However, limestone, lime, or any other readily available calcium containing material which meets the above requirements may be equally suitable, although not necessarily as economical. Although it is preferable to mix the alkali metal compound and the calcium containing material before admitting this portion of the charge into contact with the metaphosphoric acid, the respective compound and material may be admitted separately to accomplish substantially this same result.

Since the reaction between the alkali metal compound and the liquid phosphoric acid seems to take place at a temperature which approaches the boiling point of metaphosphoric acid, some of the latter may be volatilized, particularly when coarser grade of alkali metal compound is used. Likewise, since the reaction between the certain alkali metal compounds and the liquid phosphoric acid takes place at a temperature above the melting point of the alkali metal compound and in the presence of a substantial volume of the hot gaseous mixture carrying metaphosphoric acid, some of such alkali metal compounds may be volatilized. This invention provides for the separation and reaction of such volatilized alkali metal compounds and revolatilized phosphoric acid and the return of such recovered material along with the body of the liquid phosphoric acid separated from the hot gaseous mixture for reaction with subsequent portions of material charged.

It will be seen, therefore, that this invention actually may be carried out by the use of various modifications and changes without departing from its spirit and scope, with only such limitations placed thereon as may be imposed by the prior art.

I claim:

1. Process of making sodium metaphosphate from sodium chloride and metaphosphoric acid, which comprises forming a hot gaseous mixture containing metaphosphoric acid in a heating zone in which the lowest temperature is above the melting point of the sodium metaphosphate subsequently formed, admitting the sodium chloride to said heating zone, separating metaphosphoric acid and vaporized sodium chloride from said gaseous mixture in a zone outside said heating zone maintained under conditions adapted to simultaneously separate liquid metaphosphoric acid and the vaporized sodium chloride therefrom, returning the metaphosphoric acid and sodium chloride so separated to said heating zone in contact with said sodium chloride admitted thereto, and maintaining the temperature in the heating zone so that a substantial portion of the sodium chloride and the metaphosphoric acid in the mixture react to form the fused sodium metaphosphate.

2. Process of making potassium metaphosphate from potassium chloride and metaphosphoric acid, which comprises forming a hot gaseous mixture containing metaphosphoric acid in a heating zone in which the lowest temperature is above the melting point of the potassium metaphosphate subsequently formed, admitting the potassium chloride to said heating zone, separating metaphosphoric acid and vaporized potassium chloride from said gaseous mixture in a zone outside said heating zone maintained under conditions adapted to simultaneously separate liquid metaphosphoric acid and the vaporized potassium chloride therefrom, returning the metaphosphoric acid and potassium chloride so separated to said heating zone in contact with said potassium chloride admitted thereto, and maintaining the temperature in the heating zone so that a substantial portion of the potassium chloride and the metaphosphoric acid in the mixture react to form the fused potassium metaphosphate.

3. Process of making calcium potassium metaphosphate containing a substantial proportion of potassium metaphosphate from a rock phosphate, potassium chloride and metaphosphoric acid, which comprises forming a hot gaseous mixture containing metaphosphoric acid in a heating zone in which the lowest temperature is above the melting point of the calcium potassium metaphosphate subsequently formed, admitting rock phosphate and potassium chloride to said heating zone, separating metaphosphoric acid and vaporized potassium chloride from said gaseous mixture in a zone outside said heating zone maintained under conditions adapted to simultaneously separate liquid metaphosphoric acid and the vaporized potassium chloride therefrom, returning the metaphosphoric acid and potassium chloride so separated to said heating zone in contact with said rock phosphate and potassium chloride admitted thereto, and maintaining the temperature in the heating zone so that a substantial portion of rock phosphate, potassium chloride and metaphosphoric acid in the mixture react to form fused calcium potassium metaphosphate.

4. Process of making an alkali metal metaphosphate from an alkali metal compound, reactive with metaphosphoric acid to form an alkali metal metaphosphate, and metaphosphoric acid, which comprises forming a hot gaseous mixture containing metaphosphoric acid in a heating zone in which the lowest temperature is above the melting point of the alkali metal metaphosphate subsequently formed, admitting said alkali metal compound to said heating zone, separating metaphosphoric acid and vaporized alkali metal compound from said gaseous mixture in a zone outside said heating zone maintained under conditions adapted to simultaneously separate liquid metaphosphoric acid and the vaporized alkali metal compound therefrom, returning the metaphosphoric acid and alkali metal compound so separated to said heating zone in contact with said alkali metal compound admitted thereto, and maintaining the temperature in the heating zone so that a substantial portion of the alkali metal compound and the metaphosphoric acid in the mixture react to form the fused alkali metal metaphosphate.

5. Process for making an alkali metal phosphate from an alkali metal compound, reactive with phosphoric acid to form an alkali metal phosphate, and phosphoric acid, which comprises forming a hot gaseous mixture containing metaphosphoric acid in a heating zone in which the lowest temperature is above the melting point of the alkali metal phosphate subsequently formed, admitting said alkali metal compound to said heating zone, separating phosphoric acid and vaporized alkali metal compound from said gaseous mixture in a zone outside said heating zone maintained under conditions adapted to simultaneously separate liquid phosphoric acid and the vaporized alkali metal compound therefrom, returning the phosphoric acid and alkali metal compound so separated to said heating zone in contact with said alkali metal compound admitted thereto, and maintaining the temperature in the heating zone so that a substantial portion of the alkali metal compound and the phosphoric acid in the mixture react to form the fused alkali metal phosphate.

GORDON R. POLE.